United States Patent
Meng et al.

(10) Patent No.: US 12,008,701 B2
(45) Date of Patent: Jun. 11, 2024

(54) COMPUTING SYSTEM AND METHOD FOR RENDERING AVATARS

(71) Applicant: Lemon Inc., Grand Cayman (KY)

(72) Inventors: Jie Meng, Los Angeles, CA (US); Tingwen Liao, Culver City, CA (US); Maryyann Crichton, Culver City, CA (US); Siding Chen, Los Angeles, CA (US); Vishnuvardhan Tanguturi, Culver City, CA (US)

(73) Assignee: LEMON INC., Grand Cayman (KY)

( * ) Notice: Subject to any disclaimer, the term of this patent is extended or adjusted under 35 U.S.C. 154(b) by 49 days.

(21) Appl. No.: 17/806,701

(22) Filed: Jun. 13, 2022

(65) Prior Publication Data

US 2023/0401773 A1    Dec. 14, 2023

(51) Int. Cl.
*G06T 13/40*    (2011.01)
*G06F 3/01*    (2006.01)
(Continued)

(52) U.S. Cl.
CPC ............... *G06T 13/40* (2013.01); *G06F 3/012* (2013.01); *G06T 7/246* (2017.01); *G06T 7/73* (2017.01);
(Continued)

(58) Field of Classification Search
CPC ........... G06T 13/40; G06T 7/246; G06T 7/73; G06T 19/006; G06T 2207/30201; G06T 2219/024; G06F 3/012
See application file for complete search history.

(56) References Cited

U.S. PATENT DOCUMENTS

2016/0110922 A1    4/2016   Haring
2020/0053318 A1    2/2020   Li et al.
(Continued)

FOREIGN PATENT DOCUMENTS

WO    WO-2021187646 A1 *  9/2021

OTHER PUBLICATIONS

"AVMultiCamPiP: Capturing from Multiple Cameras," Apple Developer, Available Online at https://developer.apple.com/documentation/avfoundation/cameras_and_media_capture/avmulticampip_capturing_from_multiple_cameras, Available as Early as Jun. 19, 2019, 3 pages.
(Continued)

*Primary Examiner* — Chong Wu
(74) *Attorney, Agent, or Firm* — Alleman Hall & Tuttle LLP

(57) ABSTRACT

A computing system is provided comprising a processor is configured to execute an augmented reality avatar program to receive a second-user avatar-data object and second-user pose information, via a computer network, receive an image from a live image feed captured by a camera of the computing device, identify a virtual surface corresponding to a physical surface that appears in the image; calculate a position and a pose of a second-user avatar relative to the virtual surface based on the second-user pose information, render the second-user avatar-data object to thereby display the second-user avatar of the second user superimposed upon the image. The second-user avatar is anchored to the virtual surface according to the calculated position and pose of the second-user avatar. The virtual surface is world-locked to the physical surface in the image in a real world 3-D environment.

20 Claims, 9 Drawing Sheets

(51) Int. Cl.
    *G06T 7/246* (2017.01)
    *G06T 7/73* (2017.01)
    *G06T 19/00* (2011.01)

(52) U.S. Cl.
    CPC .. *G06T 19/006* (2013.01); *G06T 2207/30201* (2013.01); *G06T 2219/024* (2013.01)

(56) References Cited

U.S. PATENT DOCUMENTS

| | | | |
|---|---|---|---|
| 2021/0373741 A1 | 12/2021 | Agarawala et al. | |
| 2023/0179756 A1* | 6/2023 | Shimizu | H04N 21/6587 345/419 |
| 2023/0306640 A1* | 9/2023 | Berestov | A63F 13/216 |

OTHER PUBLICATIONS

"Hey, ItsMe," Natural Synthetics, Inc., Available Online at https://www.itsme.video/, Available as Early as Oct. 25, 2020, 3 pages.

"Create an avatar with Meta Quest," Meta, Available Online at https://store.facebook.com/help/quest/articles/in-vr-experiences/oculus-features/oculus-account-create-avatar/, Retrieved on May 10, 2022, 3 pages.

"Pokémon GO," Pokémon GO Website, Available Online at https://pokemongolive.com/en/, Available as Early as Jul. 11, 2016, 7 pages.

"Ready Player Me: Cross-game Avatar Platform for the Metaverse," Ready Player Me, Available Online at https://readyplayer.me/, Available as Early as May 5, 2020, 7 pages.

"Simultaneous localization and mapping," Wikipedia Website, Available Online at https://en.wikipedia.org/wiki/Simultaneous_localization_and_mapping, Available as Early as Jan. 31, 2005, 11 pages.

"Tracking and Visualizing Faces," Apple Developer, Available Online at https://developer.apple.com/documentation/arkit/content_anchors/tracking_and_visualizing_faces, Available as Early as Feb. 20, 2021, 7 pages.

ISA Intellectual Property Office of Singapore, International Search Report Issued in Application No. PCT/SG2023/050393, Nov. 9, 2023, WIPO, 3 pages.

\* cited by examiner

COMPUTING SYSTEM AND METHOD FOR RENDERING AVATARS

BACKGROUND

With the proliferation of online platforms for interaction between people, including social media services, messaging services, and online gaming services, people increasingly use avatars to represent themselves in the online world. Broadly speaking, avatars are images that represent users in a virtual world, which are often in the shape of a human being, cartoon character, or arbitrary object. Some avatars are two dimensional, while others are three dimensional. Some avatars are configured to move or change facial expression along with the movements and facial expressions of a user, which are captured by a camera. However, even with such animated avatars, it can be said that interaction with another person's avatar in a videochat, for example, lacks a feeling of togetherness between the users. Therefore, opportunities exist to improve the user experience when using avatars in computer based interactions with others.

SUMMARY

In view of the above, a computing system is provided comprising a processor and memory of a computing device of a first user. The processor is configured to execute an augmented reality avatar program using portions of the memory to receive a second-user avatar-data object and second-user pose information of a second user, via a computer network. The processor is further configured to receive an image from a live image feed captured by a camera of the computing device, identify a virtual surface corresponding to a physical surface that appears in the image, calculate a position and a pose of a second-user avatar relative to the virtual surface based on the second-user pose information, and render the second-user avatar-data object to thereby display the second-user avatar of the second user superimposed upon the image. The second-user avatar is anchored to the virtual surface according to the calculated position and pose of the second-user avatar. The virtual surface is world-locked to the physical surface in the image in a real world three-dimensional environment.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
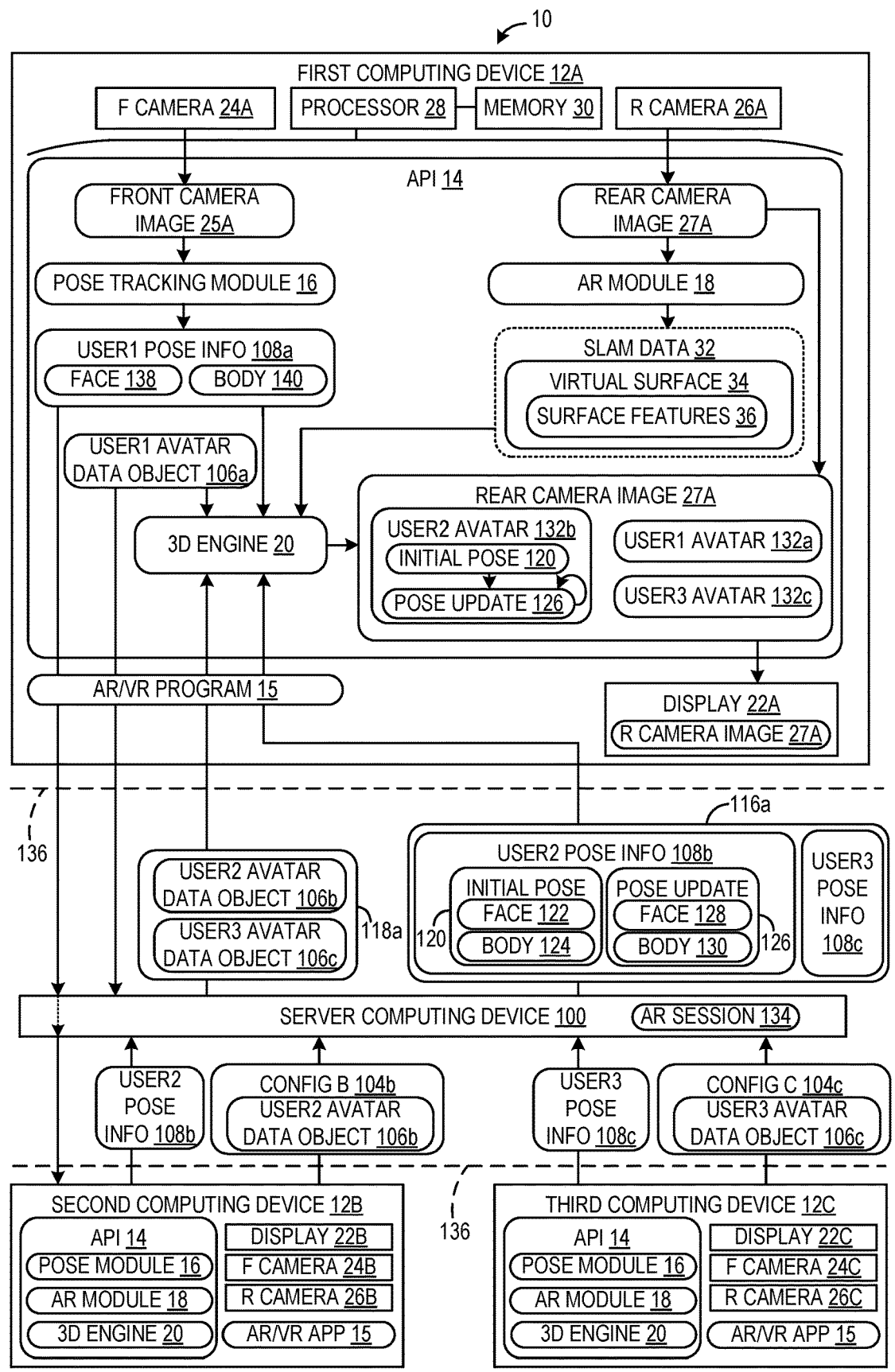
FIG. 1 illustrates a schematic view of a computing system according to an example of the present disclosure.
Figure 2:
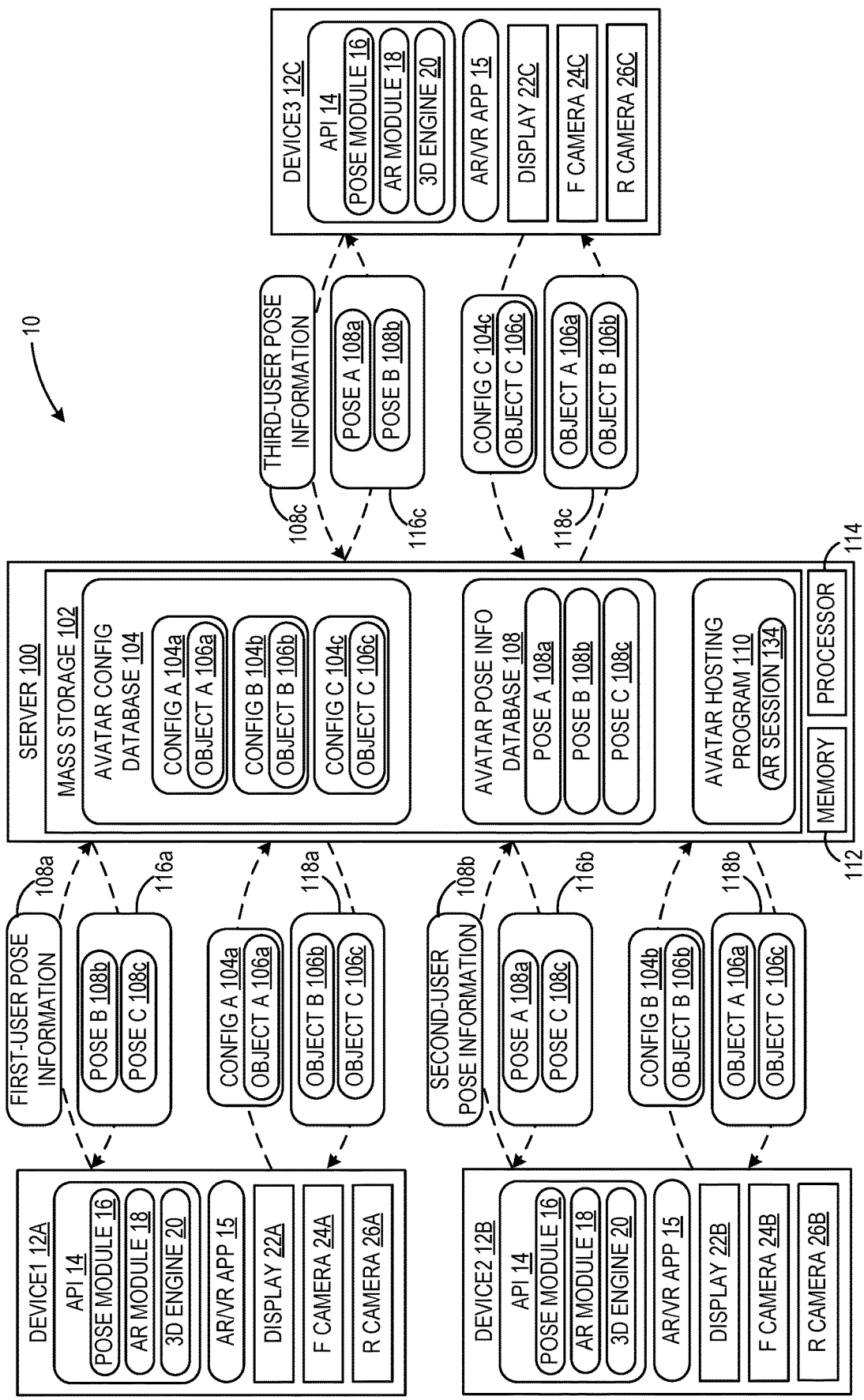
FIG. 2 illustrates another schematic view of the computing system of FIG. 1.

Referring to FIGS. 1 and 2, a computing system 10 comprises a first computing device 12A of a first user, a second computing device 12B of a second user, and a third computing device 12C of a third user. It will be appreciated that the number of users and their computing devices is not particularly limited, and the number of computing devices in the computing system 10 may be more than three, or just two. The first computing device 12A of the first user comprises a processor 28, a memory 30, a front-facing camera 24A configured to capture a first-user image 25A of the first user, a rear-facing camera 26A configured to capture a live image feed and an image 27A, and a display 22A configured to display the image 27A. It will be appreciated that the other computing devices in the computing system 10 are also provided with similar hardware as the first computing device 12A, so that the second computing device 12B also comprises a processor, a memory, a front-facing camera 24B, a rear-facing camera 26B, and a display 22B, and the third computing device 12C also comprises a processor, a memory, a front-facing camera 24C, a rear-facing camera 26C, and a display 22C.

The processor 28 is configured to execute an augmented reality program 14 using portions of the memory 30 to receive a second-user avatar-data object 106b and second-user pose information 120 of a second user, via a computer network 136. The augmented reality program 14 receives the image 27A from the live image feed captured by the rear-facing camera 26A, identifies a virtual surface 34 corresponding to a physical surface that appears in the image 27A, calculates a position and a pose of a second-user avatar 132b relative to the virtual surface 34 based on the second-user pose information 120, and renders the second-user avatar-data object 106b to thereby display the second-user avatar 132b of the second user superimposed upon the image 27A. The second-user avatar 132b is anchored to the virtual surface 34 according to the calculated position and pose of the second-user avatar 132b. The virtual surface 34 is world-locked to the physical surface in the image 27A in a real world three-dimensional environment. The second-user pose information 120 and the image 27A may be initial second-user pose information and an initial image of a session of the augmented reality program 14, respectively.

The processor 28 also executes a pose tracking module 16 which is configured to receive the first-user image 25A captured by the front-facing camera 24A, identify tracking features in the first-user image 25A of the first user, generate first-user pose information 108a of the first user based on the identified tracking features, and send the first-user pose information 108a to a second computing device 12B of the second user via the computer network 136 and also to the three-dimensional engine 20 of the first computing device 12A for rendering and displaying the first-user avatar 132a on the display 22A.

The image 27A from the live image feed captured by the rear-facing camera 26A is received by an augmented reality module 18, which the identifies the virtual surface 34 corresponding to the physical surface that appears in the image 27A by identifying surface features 36 of the virtual surface 34. The augmented reality module 18 may optionally perform simultaneous location and mapping (SLAM) within the physical environment, to thereby produce a map of the physical environment including a mesh of reconstructed surfaces, including the virtual surface 34. The identified virtual surface 34 may be included in SLAM data 32 containing the map that is generated by the augmented reality module 18.

To render the avatars 132a, 132b, 132c to be superimposed on the image 27A, a three-dimensional engine 20 may receive the SLAM data 32 of the first computing device 12A, the pose information 108a-c of all the users in the image 27A (first-user pose information 108a of the first user, the second-user pose information 108b of the second user, the third-user pose information 108c of the third user), the avatar-data objects 106a-c of all the users in the image 27A (first-user avatar-data object 106a of the first user, second-user avatar-data object 106b of the second user, third-user avatar-data object 106c of the third user), then calculate the positions and poses of some or all of the avatars 132a-c of the users (first-user avatar 132a, second-user avatar 132b, third-user avatar 132c) relative to the identified virtual surface 34. The three-dimensional engine 20 then renders some or all of the avatars 132a-c of the users to thereby display the rendered avatars 132a-c of the users superimposed upon the image 27A on the display 22A of the first computing device 12A. The three-dimensional engine 20 may be UNITY3D, UNREAL ENGINE, or EffectSDK, for example.

Next, the augmented reality program 14 is executed to, in a loop, receive updated second-user pose information 126 of the second user via the computer network 136, receive an updated image 27A from the live image feed captured by the rear-facing camera 26A of the first computing device 12A, calculate a position and a pose of the second-user avatar 132b relative to the virtual surface 34 based on the updated second-user pose information 126, and render the second-user avatar-data object 106b to thereby display the second-user avatar 132b of the second user superimposed upon the updated image 27A. The second-user avatar 132b is posed according to the updated second-user pose information 126 on each pass through the loop while the second-user avatar 132b remains anchored to the virtual surface 34, which remains world-locked to the physical surface in the image 27A in the real world three-dimensional environment.

Similar looping feedback processes are also implemented for the other avatars 132a, 132c, so that the first-user avatar 132a is posed according to the first-user pose information 108a which is updated on each pass through the loop while the first-user avatar 132a remains anchored to the virtual surface 34, and the third-user avatar 132c is posed according to the third-user pose information 108c which is updated on each pass through the loop while the third-user avatar 132c remains anchored to the virtual surface 34.

The second-user pose information 120 and the updated second-user pose information 126 may include second face tracking data 122, 128, respectively. The processor 28 may be configured to execute the three-dimensional engine 20 to render the second-user avatar-data object 132b of the second user based on the second face tracking data 122, 128 to thereby display the second-user avatar 132b of the second user posed with a face which corresponds to a facial expression of the second user. The face of the second-user avatar 132b may be rendered so as to change appearance as the second face tracking data 128 changes in successive passes through the loop. Similar looping feedback processes may also be implemented for the third-user avatar 132c, so that the third-user avatar 132c is rendered so as to change appearance as the face tracking data of the third-user pose information 108c changes in successive passes through the loop.

Similar looping feedback processes may also be implemented for the first-user avatar 132a. The first-user pose information 108a may include first face tracking data 138. The processor 28 may be configured to execute the three-dimensional engine 20 to render a first-user avatar-data object 106a of the first user based on the first face tracking data 138 of the first-user pose information 108a to thereby display the first-user avatar 132a of the first user posed with a face which corresponds to a facial expression of the first user. The face of the first-user avatar 132a may be rendered so as to change appearance as the first face tracking data 138 changes in successive passes through the loop.

The second-user pose information 120 and the updated second-user pose information 126 may include second skeletal tracking data 124, 130, respectively. The processor 28 is configured to execute the three-dimensional engine 20 to render a body of the second-user avatar 132b based on the second skeletal tracking data 124, 130 so as to change appearance as the second skeletal tracking data 124, 130 changes in successive passes through the loop. Similar looping feedback processes may also be implemented for the third-user avatar 132c, so that a body of the third-user avatar 132c is rendered so as to change appearance as the skeletal tracking data of the third-user pose information 108c changes in successive passes through the loop.

Similar looping feedback processes may also be implemented for the first-user avatar 132a. The first-user pose information 108a may include first skeletal tracking data 140. The processor 28 may be configured to execute the three-dimensional engine 20 to render a body of a first-user avatar 132a based on the first skeletal tracking data 140 so as to change appearance as the first skeletal tracking data 140 changes in successive passes through the loop.

Responsive to generating the first-user pose information 108a, the processor 28 is configured to render the first-user avatar-data object 106a of the first user to thereby display the first-user avatar 132a of the first user superimposed upon the updated image 27A, so that the first-user avatar 132a is posed according to the first-user pose information 108a.

Although the pose tracking module 16 is depicted in this example as receiving a front-facing camera image 25A from the front-facing camera 24A, alternatively or additionally, the pose tracking module 16 may be configured to receive a rear camera image 27A from the rear-facing camera 26A, so that the processor 28 is configured to execute the pose tracking module 16 to identify tracking features in the image 27A and the updated image 27A captured by the rear-facing camera 26A and the first-user image 25A of the first user, generate first-user pose information 108a of the first user based on the identified tracking features, and send the first-user pose information 108*a* to the second computing device 12B of the second user via the computer network 136. In this example, the front-facing camera 24A and the rear-facing camera 26A would be operated to capture the first-user image 25A and the updated image 27A, respectively, in real-time with time stamps syncing the identified tracking features in the image 27A and the updated image 27A with the identified tracking features in the first-user image 25A of the first user.

In one scenario, the users participate in a live augmented reality session 134 hosted by a server computing system 100 of a social media platform, where the users each have their own associated accounts. In the example of FIG. 1, the first computing device 12A of the first user, the second computing device 12B of the second user, and the third computing device 12C of the third user each execute an instance of the augmented reality avatar program 15 that is configured to communicate with a server computing system 100 of the social media platform, and also execute instances of the augmented reality program 14, the pose tracking module 16, the augmented reality module 18, and the three-dimensional engine 20. A first-user pose information 108*a* of the first user, a first-user avatar-data object 106*a* of the first user, the second-user pose information 120, the updated second-user pose information 126, and the second-user avatar-data object 106*b* are exchanged between the augmented reality avatar program 15 executed on the first computing device 12A and the augmented reality avatar program 15 executed on the second computing device 12B via the server computing system 100. It will be appreciated that the pose information of each user is continually sampled in a control loop for the live augmented reality session 134. Accordingly, to distinguish the first time the second-user pose information 120 is captured, the second-user pose information 120 may be referred to as initial second-user pose information.

As shown in FIG. 1 and illustrated in more detail in FIG. 2, the avatar-data objects and the pose information may be packaged into data containers or configuration files by the server computing device 100, which sends the data containers to the respective computing devices of the computing system 10. The avatar-data objects may be sent by the computing devices 12A-C to the server computing device 100 in configuration files, which are descriptive files specifying lists of properties and attributes of the avatars. For example, configuration files may specify hair color, eye color, clothes, accessories, virtual skeleton structure, body skin shape, facial expression control points, etc.

In the example of FIG. 1, the server computing device 100 sends a first avatar data container 118*a* containing the second-user avatar-data object 106*b* and the third-user avatar-data object 106*c* to the first computing device 12A, and also sends a first pose data container 116*a* containing the second-user pose information 108*b* and the third-user pose information 108*c* to the first computing device 12A. The second computing device 12B sends a second configuration file 104*b* containing the second-user avatar-data object 106*b* to the server computing device 100, and the third computing device 12C sends a third configuration file 104*c* containing the third-user avatar-data object 106*c* to the server computing device 100.

FIG. 2 is schematic illustration of a server computing device 100 exchanging pose information and avatar-data objects with the three computing devices 12A-C of FIG. 1. The server computing device 100 comprises a processor 114, a non-volatile storage device 102 operatively coupled to the processor 114, and an avatar hosting program 110 stored in the non-volatile storage device 102, which may be loaded into volatile memory 112 and executed by the processor 114 of the server computing device 100.

In an initialization process, when the avatars 132*a-c* are initially rendered on the displays 22A-C of the computing devices 12A-C, the avatar hosting program 110 is configured to host an augmented reality session 134 to receive second-user pose information 108*b* and a second configuration file 104*b* containing a second-user avatar-data object 106*b* from the second computing device 12B of the second user. The server computing device also receives initial first-user pose information 108*a* and a first configuration file 104*a* containing a first-user avatar-data object 106*a* from the first computing device 12A of the first user, and receives initial third-user pose information 108*c* and a third configuration file 104*c* containing a third-user avatar-data object 106*c* from the third computing device 12C of the third user. The avatar hosting program 110 then stores the first configuration file 104*a*, the second configuration file 104*b*, and the third configuration file 104*c* in an avatar configuration database 104, and stores the initial first-user pose information 108*a*, the second-user pose information 108*b*, and the initial third-user pose information 108*c* in an avatar pose information database 108.

Responsive to receiving a first request from a first computing device 12A, the avatar hosting program 110 sends the second-user avatar-data object 106*b* and the second-user pose information 108*b* to the first computing device 12A. The first request may be the first configuration file 104*a* and first-user pose information 108*a* of the first user. In this example, where the avatars of three users are to be rendered on the display 22A of the first computing device 12A, the avatar hosting program 110 sends to the first computing device 12A a first avatar data container 118*a* containing a second-user avatar-data object 106*b* and a third-user avatar-data object 106*c*, and a first pose data container 116*a* containing second-user pose information 108*b* and third-user pose information 108*c*. This causes the first computing device 12A to render the second-user avatar-data object 106*b* and the third-user avatar-data object 106*c* to display the second-user avatar and the third-user avatar on the display 22A.

Responsive to receiving a second request from the second computing device 12B, the avatar hosting program 110 sends the first-user avatar-data object 106*a* and the initial first-user pose information 108*a* to the second computing device 12B. The second request may be the second configuration file 104*b* and second-user pose information 108*b* of the second user. In this example, where the avatars of three users are to be rendered on the display 22B of the second computing device 12B, the avatar hosting program 110 sends to the second computing device 12B a second avatar data container 118*b* containing a first-user avatar-data object 106*a* and a third-user avatar-data object 106*c*, and a second pose data container 116*b* containing first-user pose information 108*a* and third-user pose information 108*c*. This causes the second computing device 12B to render the first-user avatar-data object 106*a* and the third-user avatar-data object 106*c* to display the first-user avatar and third-user avatar on the display 22B.

Responsive to receiving a third request from the third computing device 12C, the avatar hosting program 110 sends the third-user avatar-data object 106*c* and the initial third-user pose information 108*c* to the third computing device 12C. The third request may be the third configuration file 104*c* and third-user pose information 108*c* of the third user. In this example, where the avatars of three users are to be rendered on the display 22C of the third computing device 12C, the avatar hosting program 110 sends to the third computing device 12C a third avatar data container 118c containing a first-user avatar-data object 106a and a second-user avatar-data object 106b, and a third pose data container 116c containing first-user pose information 108a and second-user pose information 108b. This causes the third computing device 12C to render the first-user avatar-data object 106a and the second-user avatar-data object 106b to display the second-user avatar and third-user avatar on the display 22C.

Following the initialization process, a runtime process is executed, in which the avatars are continuously re-rendered by the displays of the computing devices in a loop with continuously updated pose information. In the loop, the processor 114 of the server computing device 100 is configured to receive updated second-user pose information 108b of the second user from the second computing device 12B. Responsive to receiving the updated second-user pose information 108b, the processor 114 sends the updated second-user pose information 108b to the first computing device 12A and the third computing device 12C, thereby causing the first computing device 12A to render the second-user avatar-data object 106b using the updated second-user pose information 108b and display the second-user avatar on the display 22A, and causing the third computing device 12C to render the second-user avatar-data object 106b using the updated second-user pose information 108b and display the second-user avatar on the display 22C. Then updated first-user pose information 108a of the first user is received from the first computing device 12A, and updated third-user pose information 108c of the third user is received from the third computing device 12C. Responsive to receiving the updated first-user pose information 108a and the updated third-user pose information 108c, the updated first-user pose information 108a and the updated third-user pose information 108c are sent to the second computing device 12B, thereby causing the second computing device 12B to render the first-user avatar-data object 106a using the updated first-user pose information 108a, render the third-user avatar-data object 106c using the updated third-user pose information 108c, and display the first-user avatar and the third-user avatar on the display 22B.

It will be appreciated that a similar runtime process may be executed on the first computing device 12A to render the second-user avatar-data object 106b using the updated second-user pose information 108b, render the third-user avatar-data object 106c using the updated third-user pose information 108c, and display the second-user avatar and the third-user avatar on the display 22A. Likewise, a similar runtime process may be executed on the third computing device 12C to render the second-user avatar-data object 106b using the updated second-user pose information 108b, render the first-user avatar-data object 106a using the updated first-user pose information 108a, and display the first-user avatar and the second-user avatar on the display 22C.

The initial first-user pose information 108a and the updated first-user pose information 108a may include first face tracking data, the second-user pose information 108b and the updated second-user pose information 108b may include second face tracking data, and the third-user pose information 108c may include third face tracking data. For example, the second computing device 12B may be caused to render the first-user avatar-data object 106a of the first user based on the first face tracking data to thereby display the first-user avatar of the first user posed with a face which corresponds to a facial expression of the first user. The first computing device 12A may be caused to render the second-user avatar-data object 106b of the second user based on the second face tracking data to thereby display the second-user avatar of the second user on the display 22A posed with a face which corresponds to a facial expression of the second user.

Figure 3:
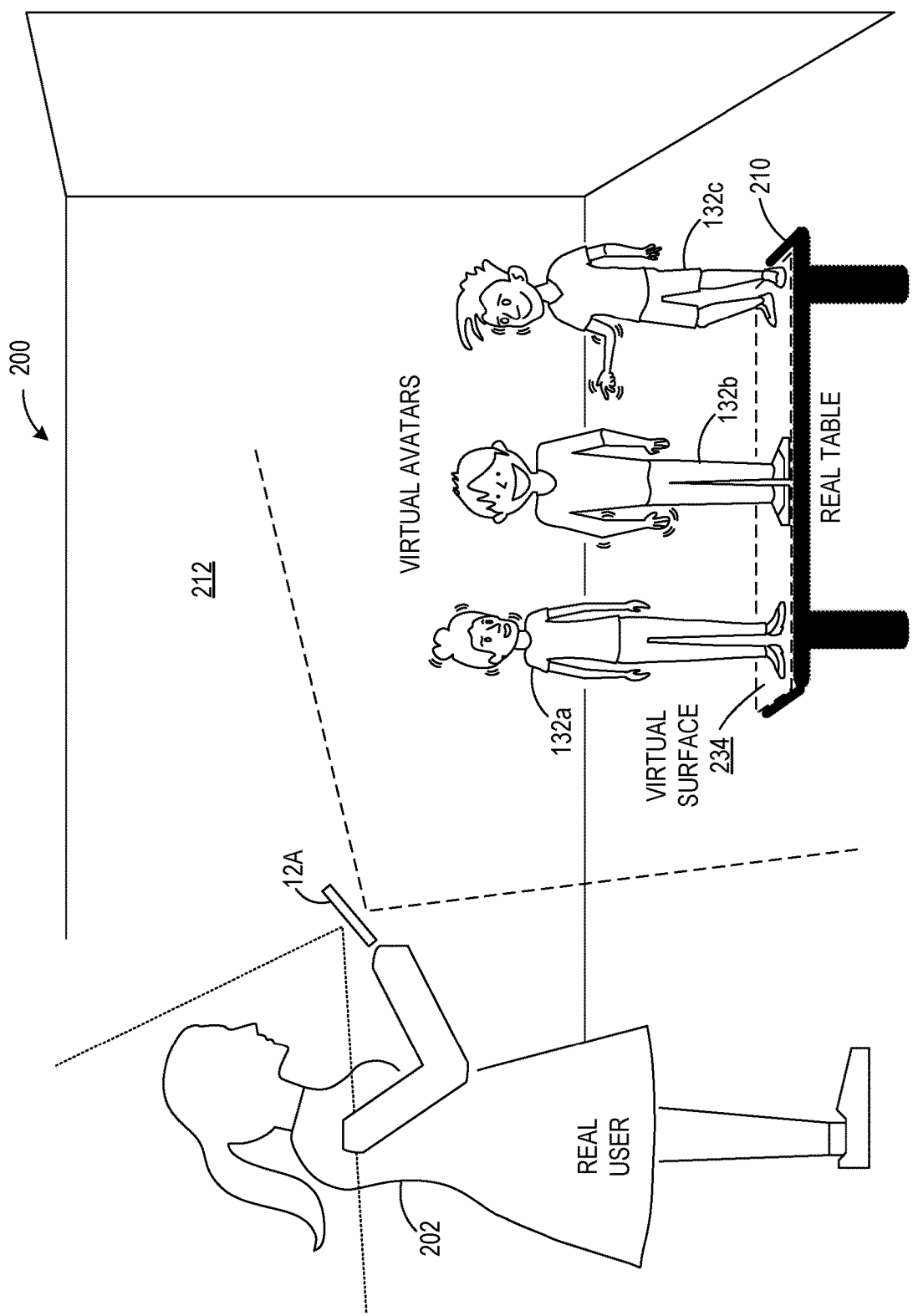
FIG. 3 illustrates an example use case for the computing system of FIG. 1 according to an example of the present disclosure, schematically showing a real user viewing three avatars displayed on a virtual surface that is world locked to a top of a real-world table.
Figure 4:
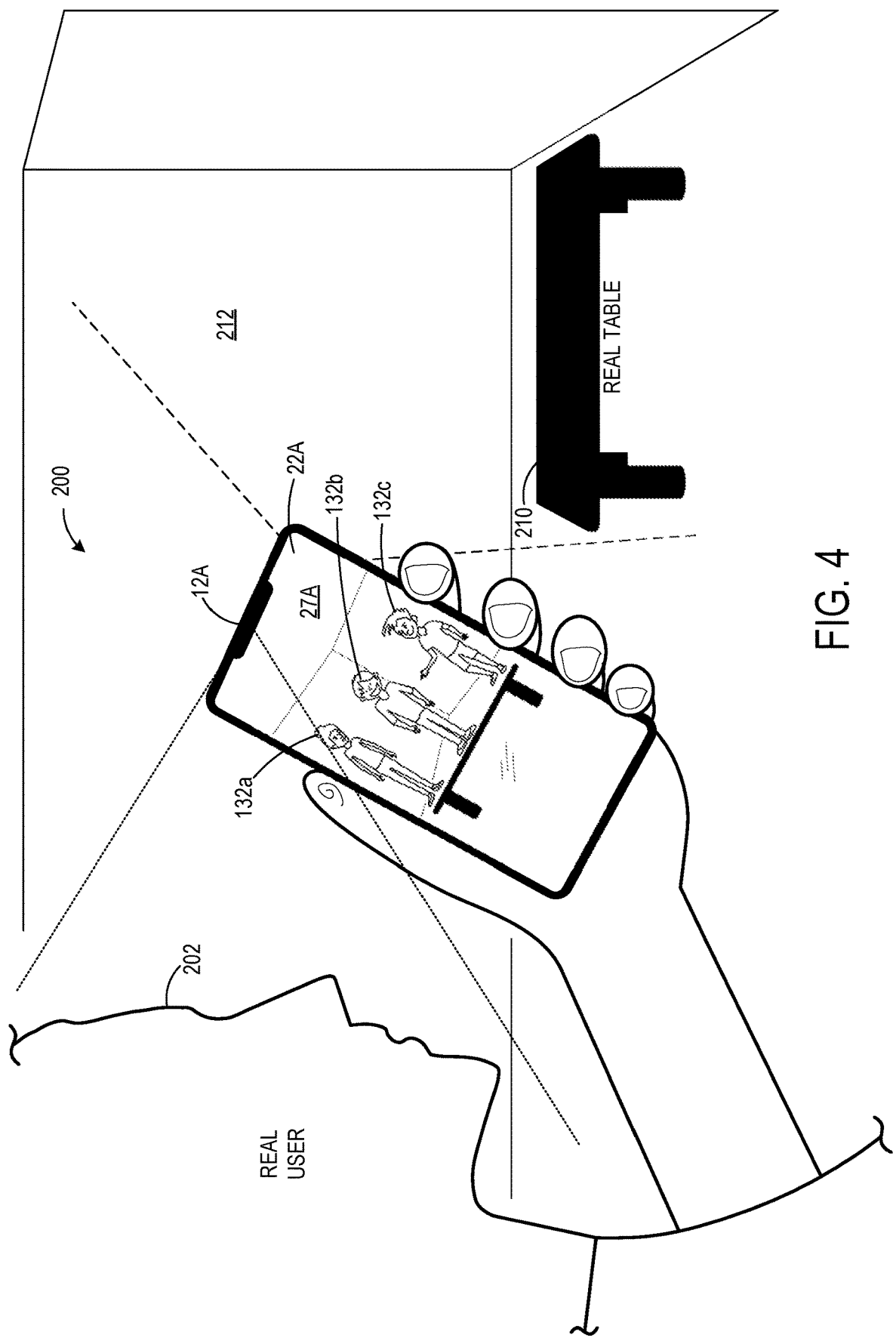
FIG. 4 is an additional illustration of the example use case of FIG. 3 according to an example of the present disclosure, showing a close up of the real world user viewing a computing device displaying an augmented reality image including the three avatars and the real-word table of FIG. 3.

Referring to FIGS. 3 and 4, an example use case illustrating aspects of the present disclosure will now be presented. As schematically shown in FIG. 3, a first user 202 may be standing in a dining room 212 in a real world three-dimensional environment 200 holding a first computing device 12A, which in this example may take the form of a smartphone. However, it will be appreciated that the computing devices are not particularly limited to smartphones, and may take any form that allows users to view augmented reality images overlaid upon the real world three-dimensional environment 200, such as specialized smartphones and tablet devices, mixed-reality head-mounted devices (HMD), etc.

The first computing device 12A performs SLAM mapping within the physical environment 200 of the dining room 212, to thereby produce a map of the dining room 212 including a mesh of reconstructed virtual surfaces and a virtual surface 234 corresponding to a physical surface 210, which is a table surface in this example use case. The virtual surface 234 may be a planar surface (as illustrated) or a curved surface, and is typically identified using by tracking visual features in the rear camera image using optical flow or depth camera. Object recognition techniques may also be used to identify the virtual surface. Alternatively to a virtual surface, suitable anchor points may be programmatically identified in the rear camera image, for anchoring each avatar. The first computing device 12A receives second-user pose information of the second user from the second computing device, third-user pose information of the third user from the third computing device.

The first computing device 12A calculates positions and poses of the first-user avatar 132a, the second-user avatar 132b, and the third-user avatar 132c relative to the identified virtual surface which is world-locked to the physical surface 210 in the real world three-dimensional environment 200 of the dining room 212. The first computing device 12A then renders the first-user avatar 132a, the second-user avatar 132b, and the third-user avatar 132c to display the rendered avatars 132a-c superimposed upon the image 27A on the display 22A of the first computing device 12A. The first user 202 viewing the display 22A of the first computing device 12A then sees the complete avatars 132a-c rendered at appropriate screen positions and in appropriate poses on the display 22A, which may give the first user 202 the illusion that the avatars 132a-c are standing in the real world three-dimensional environment 200 of the dining room 212, as shown in FIG. 3. By presenting the other users avatars together with the user's avatar in the same room, the feeling of togetherness may be increased for the interaction.

Figure 5:
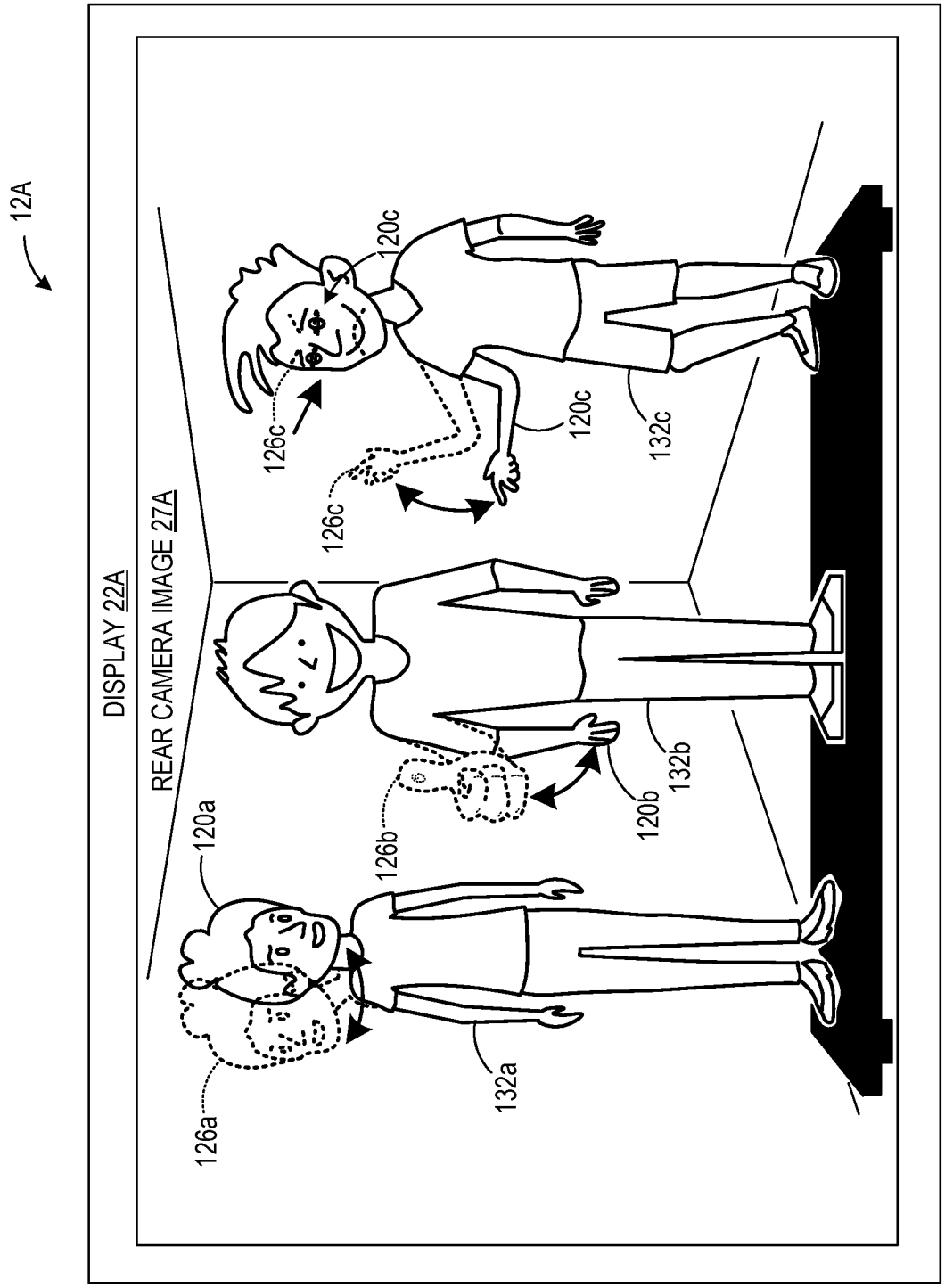
FIG. 5 is an illustration of a displayed image in the example use case of FIG. 3, showing motion of each avatar in response to user inputs, according to an example of the present disclosure.

Referring to FIG. 5, the example use case illustrated in FIGS. 3 and 4 is used to demonstrate the changes in appearances of the avatars 132a-c on the display 22A of the first computing device 12A during the runtime process, so that one or more portions of the avatars 132a-c are associated with motion. The first computing device 12A is configured to render a body of the first-user avatar 132a based on initial first-user pose information 120a, render a body of the second-user avatar 132b based on second-user pose information 120b, and render a body and face of the third-user avatar 132c based on initial third-user pose information 120c during the initialization process. In the runtime process, as indicated in dotted lines, the first computing device 12A is configured to render a body of the first-user avatar 132a based on updated first-user pose information 126a (first user turning her head), render a body of the second-user avatar 132b based on updated second-user pose information 126b (second user giving the thumbs up sign), and render a body and face of the third-user avatar 132c based on updated third-user pose information 126c (third user raising his hand and frowning).

Accordingly, the faces and bodies of the first-user avatar 132a, the second-user avatar 132b, and the third-user avatar 132c are rendered so as to change appearance as the updated first-user pose information 126a, the updated second-user pose information 126b, and the updated third-user pose information 126c change in successive passes through the loop during the runtime process. Therefore, the renderings of the avatars 132a-c achieve a realism that is enhanced by the realistic renderings of the faces and bodies of the avatars 132a-c, so that the users using their respective computing devices have a more intimate, communal experience in their online interactions with each other during the augmented reality session, in which facial expressions and body language can also be used in addition to voice and text for users to communicate with each other, and enhance a sense of physical proximity and togetherness among the participants of the augmented reality session.

Figure 6:
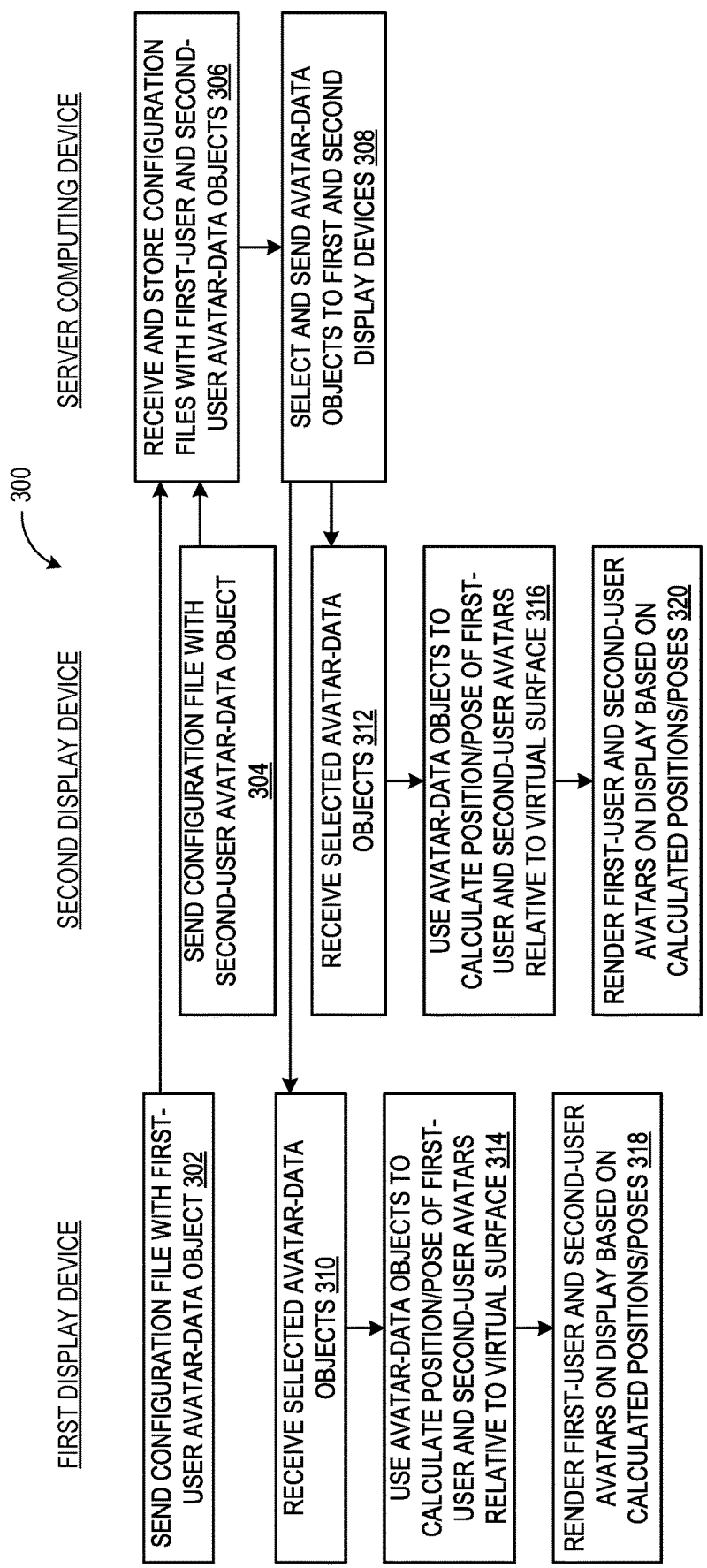
FIG. 6 is a flow chart of a method for performing an initialization process for rendering avatars according to an example embodiment of the present disclosure.

FIG. 6 illustrates a flow chart of a method 300 for an initialization process, when the avatars are initially rendered on the displays of the computing devices. The following description of method 300 is provided with reference to the software and hardware components described above and shown in FIGS. 1-5. It will be appreciated that method 300 also may be performed in other contexts using other suitable hardware and software components.

At step 302, at the first display device, a first configuration file with a first-user avatar-data object is sent to the server computing device. At step 304, at the second display device, a second configuration file with a second-user avatar-data object is sent to the server computing device. At step 306, at the server computing device, the first configuration file containing the first-user avatar-data object and the second configuration file containing the second-user avatar-data object are received and stored. At step 308, at the server computing device, the avatar-data objects to send to the first display device are selected and sent, and the avatar-data objects to send to the second display device are selected and sent. At step 310, at the first display device, the selected avatar-data objects are received from the server computing device. At step 314, at the first display device, the selected avatar-data objects are used to calculate the positions and poses of the selected avatar-data objects relative to the virtual surface, including the first-user and second-user avatar-data objects. At step 318, the selected avatar-data objects, including the first-user and second-user avatar-data objects, are rendered on the display based on the calculated positions and poses.

At step 312, at the second display device, the selected avatar-data objects are received from the server computing device. At step 316, at the second display device, the selected avatar-data objects are used to calculate the positions and poses of the selected avatar-data objects relative to the virtual surface, including the first-user and second-user avatar-data objects. At step 320, the selected avatar-data objects, including the first-user and second-user avatar-data objects, are rendered on the display based on the calculated positions and poses.

Figure 7:
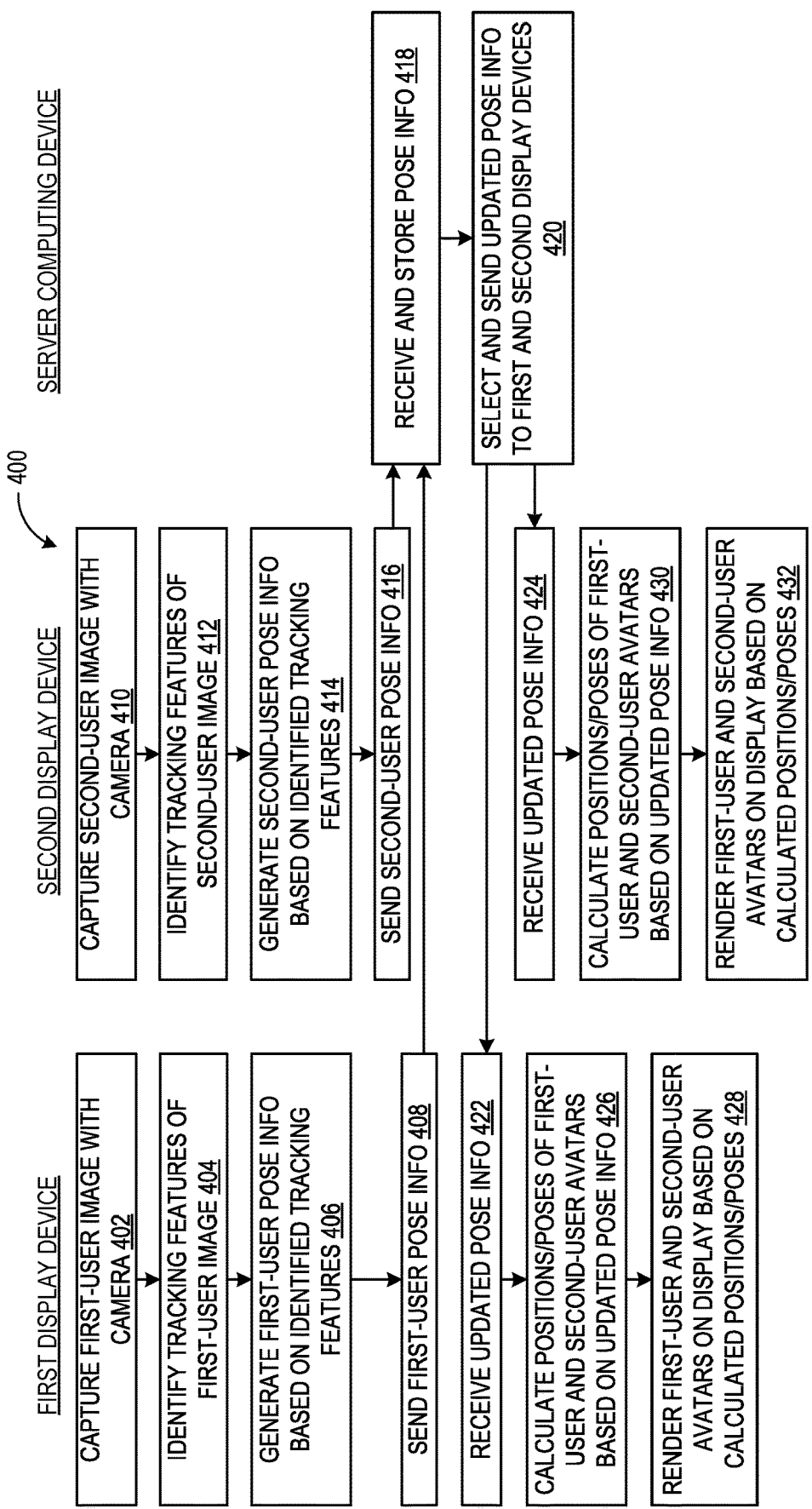
FIG. 7 is a flow chart of a method for performing a runtime process for rendering avatars according to an example embodiment of the present disclosure.

FIG. 7 illustrates a flow chart of a method 400 for a runtime process, in which the avatars are continuously re-rendered by the displays of the computing devices in a loop with continuously updated pose information. The following description of method 400 is provided with reference to the software and hardware components described above and shown in FIGS. 1-5. It will be appreciated that method 400 also may be performed in other contexts using other suitable hardware and software components.

At step 402, at the first display device, a first-user image of the first user is captured with the camera. At step 404, at the first display device, tracking features of the first-user image are identified. At step 406, at the first display device, first-user pose information is generated based on the identified tracking features. At step 408, at the first display device, the first-user pose information is sent to the server computing device.

At step 410, at the second display device, a second-user image of the second user is captured with the camera. At step 412, at the second display device, tracking features of the second-user image are identified. At step 414, at the second display device, second-user pose information is generated based on the identified tracking features. At step 416, at the second display device, the second-user pose information is sent to the server computing device.

At step 418, the first-user pose information and the second-user pose information are received and stored at the server computing device as updated pose information of the first user and the second user, respectively. At step 420, at the server computing device, the updated pose information are sent to the first and second display devices, respectively.

At the first display device, steps 422, 426, and 428 are performed. At step 422, the updated second-user pose information is received. At step 426, the positions and poses of the first-user avatar and the second-user avatar are calculated based on the first-user and second-user pose information. At step 428, the first-user avatar and the second-user avatar are rendered on the display based on the calculated positions and poses.

At the second display device, steps 424, 430, and 432 are performed. At step 424, the updated first-user pose information is received. At step 430, the positions and poses of the first-user avatar and the second-user avatar are calculated based on the first-user and second-user pose information. At step 432, the first-user avatar and the second-user avatar are rendered on the display based on the calculated positions and poses.

Figure 8:
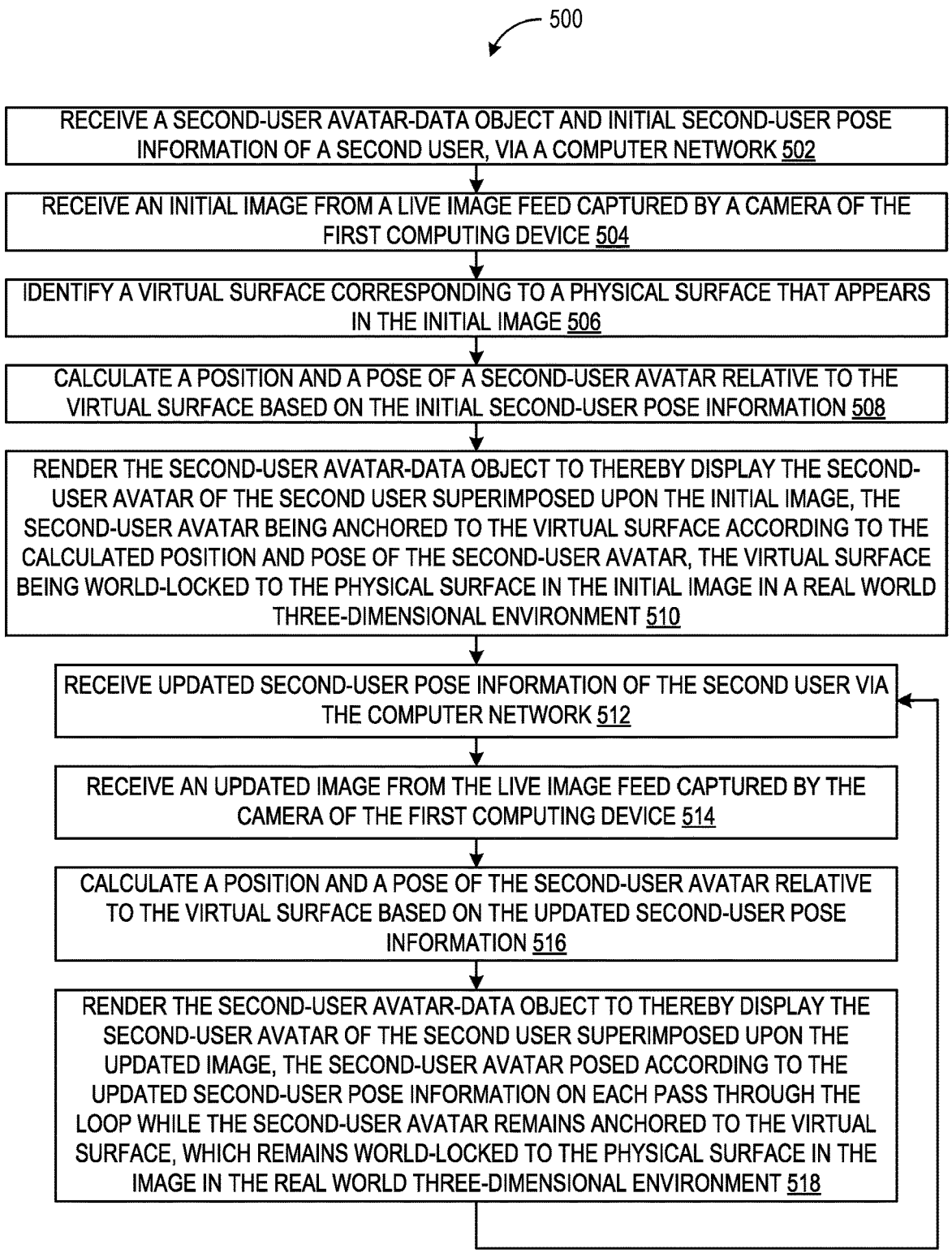
FIG. 8 is a flow chart of a method for rendering avatars according to an example embodiment of the present disclosure.

FIG. 8 illustrates a flow chart of a method 500. The following description of method 500 is provided with reference to the software and hardware components described above and shown in FIGS. 1-5. It will be appreciated that method 500 also may be performed in other contexts using other suitable hardware and software components.

At step 502, a second-user avatar-data object and second-user pose information of a second user are received via a computer network. At step 504, an image is received from a live image feed captured by a camera of the first computing device. At step 506, a virtual surface is identified corresponding to a physical surface that appears in the image.

At step 508, a position and a pose of a second-user avatar are calculated relative to the virtual surface based on the second-user pose information. At step 510, the second-user avatar-data object is rendered to thereby display the second-user avatar of the second user superimposed upon the image, the second-user avatar being anchored to the virtual surface according to the calculated position and pose of the second-user avatar, the virtual surface being world-locked to the physical surface in the image in a real world three-dimensional environment.

The following steps 512, 514, 516, and 518 are performed in a loop. At step 512, updated second-user pose information of the second user is received via the computer network. At step 514, an updated image is received from the live image feed captured by the camera of the first computing device. At step 516, a position and a pose of the second-user avatar are calculated relative to the virtual surface based on the updated second-user pose information. At step 518, the second-user avatar-data object is rendered to thereby display the second-user avatar of the second user superimposed upon the updated image, the second-user avatar posed according to the updated second-user pose information on each pass through the loop while the second-user avatar remains anchored to the virtual surface, which remains world-locked to the physical surface in the image in the real world three-dimensional environment.

It will be appreciated that methods 300, 400, and 500 are provided by way of example and is not meant to be limiting. Therefore, it is to be understood that methods 300, 400, and 500 may include additional and/or alternative steps relative to those illustrated in FIGS. 6-8. Further, it is to be understood that methods 300, 400, and 500 may be performed in any suitable order.

The above-described system and methods allow multiple users using their respective computing devices in an augmented reality session to see each other's avatars on the displays of their devices so that their positions and appearances change to correspond to the changes in the positions and appearances of the users in real-time. The renderings of the faces and bodies of the avatars are enhanced, so that the users participating in the augmented reality session can have a more intimate, communal experience in their online interactions with each other. This enhances a sense of physical proximity and togetherness, which is further enhance when facial expressions and body language are used in addition to voice and text for users to communicate with each other via their respective computing devices.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
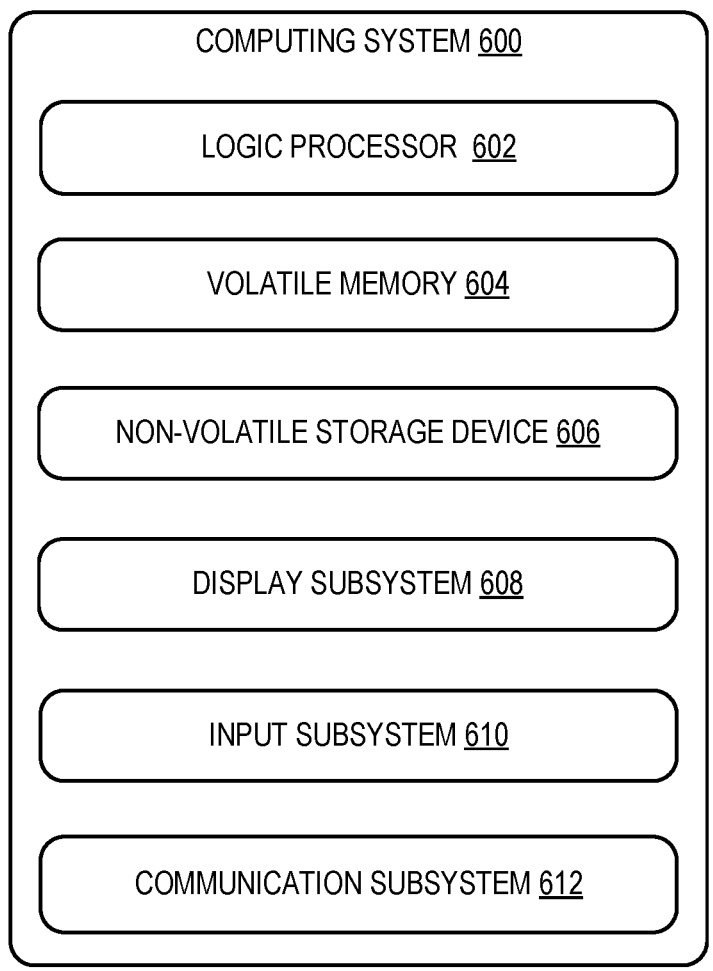
FIG. 9 shows an example computing environment of the present disclosure.

FIG. 9 schematically shows a non-limiting embodiment of a computing system 600 that can enact one or more of the methods and processes described above. Computing system 600 is shown in simplified form. Computing system 600 may embody the first computing device 12A, the second computing device 12B, the third computing device 12C, the fourth computing device 12D, and server computing device 100 described above and illustrated in FIGS. 1-5, respectively. Computing system 600 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 600 includes a logic processor 602 volatile memory 604, and a non-volatile storage device 606. Computing system 600 may optionally include a display subsystem 608, input subsystem 610, communication subsystem 612, and/or other components not shown in FIG. 9.

Logic processor 602 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 602 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 606 includes one or more physical devices configured to hold instructions executable by the logic processors to implement the methods and processes described herein. When such methods and processes are implemented, the state of non-volatile storage device 606 may be transformed—e.g., to hold different data.

Non-volatile storage device 606 may include physical devices that are removable and/or built-in. Non-volatile storage device 606 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 606 may include nonvolatile, dynamic, static, read/write, read-only, sequential-access, location-addressable, file-addressable, and/or content-addressable devices. It will be appreciated that non-volatile storage device 606 is configured to hold instructions even when power is cut to the non-volatile storage device 606.

Volatile memory 604 may include physical devices that include random access memory. Volatile memory 604 is typically utilized by logic processor 602 to temporarily store information during processing of software instructions. It will be appreciated that volatile memory 604 typically does not continue to store instructions when power is cut to the volatile memory 604.

Aspects of logic processor 602, volatile memory 604, and non-volatile storage device 606 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 600 typically implemented in software by a processor to perform a particular function using portions of volatile memory, which function involves transformative processing that specially configures the processor to perform the function. Thus, a module, program, or engine may be instantiated via logic processor 602 executing instructions held by non-volatile storage device 606, using portions of volatile memory 604. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 608 may be used to present a visual representation of data held by non-volatile storage device 606. The visual representation may take the form of a graphical user interface (GUI). As the herein described methods and processes change the data held by the non-volatile storage device, and thus transform the state of the non-volatile storage device, the state of display subsystem 608 may likewise be transformed to visually represent changes in the underlying data. Display subsystem 608 may include one or more display devices utilizing virtually any type of technology. Such display devices may be combined with logic processor 602, volatile memory 604, and/or non-volatile storage device 606 in a shared enclosure, or such display devices may be peripheral display devices.

When included, input subsystem 610 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 612 may be configured to communicatively couple various computing devices described herein with each other, and with other devices. Communication subsystem 612 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 600 to send and/or receive messages to and/or from other devices via a network such as the Internet.

The following paragraphs provide additional support for the claims of the subject application. One aspect provides a computing system, comprising: a processor and memory of a computing device of a first user, the processor being configured to execute an augmented reality (AR) avatar program using portions of memory to: receive a second-user avatar data-object and second-user pose information of a second user, via a computer network; receive an image from a live image feed captured by a camera of the computing device; identify a virtual surface corresponding to a physical surface that appears in the image; calculate a position and a pose of a second-user avatar relative to the virtual surface based on the second-user pose information; render the second-user avatar data object to thereby display the second-user avatar of the second user superimposed upon the image, the second-user avatar being anchored to the virtual surface and posed according to the calculated position and pose of the second-user avatar, the virtual surface being world-locked to the physical surface in the image in a real world three-dimensional environment. In this aspect, additionally or alternatively, the second-user pose information is initial second-user pose information of a session of the AR avatar program; and the image is an initial image of the session of the AR avatar program. In this aspect, additionally or alternatively, the AR avatar program is executed to, in a loop: receive updated second-user pose information of the second user via the computer network; receive an updated image from the live image feed captured by the camera of the computing device; calculate a position and a pose of the second-user avatar relative to the virtual surface based on the updated second-user pose information; and render the second-user avatar-data object to thereby display the second-user avatar superimposed upon the updated image and posed according to the updated pose information on each pass through the loop while the second-user avatar remains anchored to the virtual surface, which remains world locked to the physical surface in the image in the real world three-dimensional environment. In this aspect, additionally or alternatively, the second-user pose information and the updated second-user pose information include second face tracking data; the processor is configured to render the second-user avatar-data object of the second user based on the second face tracking data to thereby display the second-user avatar of the second user posed with a face which corresponds to a facial expression of the second user; and the face of the second user avatar is rendered so as to change appearance as the second face tracking data changes in successive passes through the loop. In this aspect, additionally or alternatively, the second-user pose information includes second face tracking data; and the processor is configured to render the second-user avatar-data object of the second user based on the second face tracking data to thereby display the second-user avatar of the second user posed with a face which corresponds to a facial expression of the second user. In this aspect, additionally or alternatively, the second-user pose information includes second skeletal tracking data; and the processor is configured to render a body of the second-user avatar so as to change appearance as the second skeletal tracking data changes. In this aspect, additionally or alternatively, the camera is a rear-facing camera and the computing device is a first computing device, the computing system further comprising: a front-facing camera configured to capture a first-user image of the first user, the processor being configured to: identify tracking features in the first-user image of the first user, and generate first-user pose information of the first user based on the identified tracking features; and send the first-user pose information to a second computing device of the second user via the computer network. In this aspect, additionally or alternatively, the first-user pose information includes first face tracking data; and the processor is configured to render a first-user avatar-data object of the first user based on the first face tracking data to thereby display the first-user avatar of the first user posed with a face which corresponds to a facial expression of the first user. In this aspect, additionally or alternatively, the processor is further configured to render a first-user avatar-data object of the first user to thereby display the first-user avatar of the first user superimposed upon the image, the first-user avatar posed according to the first-user pose information. In this aspect, additionally or alternatively, the front-facing camera and the rear-facing camera are operated to capture the first-user image and the image, respectively, in real-time with time stamps syncing the identified tracking features in the image with the identified tracking features in the first-user image of the first user. In this aspect, additionally or alternatively, the processor is configured to: identify tracking features in the image captured by the rear-facing camera and the first-user image of the first user; generate first-user pose information of the first user based on the identified tracking features; and send the first-user pose information to the second computing device of the second user via the computer network. In this aspect, additionally or alternatively, the computing device is a first computing device; the first user and the second user each have associated accounts on a social media platform; the first computing device and a second computing device each execute an instance of the AR avatar program that is configured to communicate with a server computing system of the social media platform; and a first-user pose information of the first user, a first-user avatar-data object of the first user, the second-user pose information, and the second-user avatar-data object are exchanged between the AR avatar program executed on the first computing device and the AR avatar program executed on the second computing device via the server computing system.

Another aspect provides a method for a client program executed on a computing device operated by a first user, the method comprising steps to: receive a second-user avatar-data object and second-user pose information of a second user, via a computer network; receive an image from a live image feed captured by a camera of the computing device; identify a virtual surface corresponding to a physical surface that appears in the image; calculate a position and a pose of a second-user avatar relative to the virtual surface based on the second-user pose information; and render the second-user avatar-data object to thereby display the second-user avatar of the second user superimposed upon the image, the second-user avatar being anchored to the virtual surface according to the calculated position and pose of the second-user avatar, the virtual surface being world-locked to the physical surface in the image in a real world three-dimensional environment. In this aspect, additionally or alternatively, the method further comprises steps to, in a loop: receive updated second-user pose information of the second user via the computer network; receive an updated image from the live image feed captured by the camera of the computing device; calculate a position and a pose of the second-user avatar relative to the virtual surface based on the updated second-user pose information; and render the second-user avatar-data object to thereby display the second-user avatar of the second user superimposed upon the updated image, the second-user avatar posed according to the updated second-user pose information on each pass through the loop while the second-user avatar remains anchored to the virtual surface, which remains world-locked to the physical surface in the image in the real world three-dimensional environment. In this aspect, additionally or alternatively, the second-user pose information includes second face tracking data; and the method further comprises rendering the second-user avatar-data object of the second user based on the second face tracking data to thereby display the second-user avatar of the second user posed with a face which corresponds to a facial expression of the second user. In this aspect, additionally or alternatively, the computing device is a first computing device; and the method further comprises steps to: capture a first-user image of the first user; identify tracking features in the first-user image of the first user; generate first-user pose information of the first user based on the identified tracking features; and send the first-user pose information to a second computing device of the second user via the computer network. In this aspect, additionally or alternatively, the first-user pose information includes first face tracking data; and the method further comprises rendering a first-user avatar-data object of the first user based on the first face tracking data to thereby display the first-user avatar of the first user posed with a face which corresponds to a facial expression of the first user.

Another aspect provides a server computing device, comprising: a processor; a non-volatile storage device operatively coupled to the processor; and an avatar hosting program stored in the non-volatile storage device and executed by the processor of the server computing device, the avatar hosting program being configured to host an avatar session to: receive and store a second-user avatar-data object and second-user pose information of a second user from a second computing device; responsive to receiving a first request from a first computing device for a second-user avatar, send the second-user avatar-data object and the second-user pose information to the first computing device, thereby causing the first computing device to render the second-user avatar-data object and display the second-user avatar; receive and store a first-user avatar-data object and initial first-user pose information of a first user from the first computing device; responsive to receiving a second request from the second computing device for a first-user avatar, send the first-user avatar-data object and the initial first-user pose information to the second computing device, thereby causing the second computing device to render the first-user avatar-data object and display the first-user avatar; and in a loop: receive updated second-user pose information of the second user from the second computing device; and responsive to receiving the updated second-user pose information, send the updated second-user pose information to the first computing device, thereby causing the first computing device to render the second-user avatar-data object using the updated second-user pose information and display the second-user avatar; receive updated first-user pose information of the first user from the first computing device; and responsive to receiving the updated first-user pose information, send the updated first-user pose information to the second computing device, thereby causing the second computing device to render the first-user avatar-data object using the updated first-user pose information and display the first-user avatar. In this aspect, additionally or alternatively, the initial first-user pose information and the updated first-user pose information include first face tracking data; the second computing device is caused to render the first-user avatar-data object of the first user based on the first face tracking data to thereby display the first-user avatar of the first user posed with a face which corresponds to a facial expression of the first user; the second-user pose information and the updated second-user pose information include second face tracking data; and the first computing device is caused to render the second-user avatar-data object of the second user based on the second face tracking data to thereby display the second-user avatar of the second user posed with a face which corresponds to a facial expression of the second user. In this aspect, additionally or alternatively, the initial first-user pose information and the updated first-user pose information include first skeletal tracking data; the second computing device is caused to render the first-user avatar-data object of the first user based on the first skeletal tracking data to thereby display the first-user avatar of the first user posed with a body which changes appearance as the first skeletal tracking data changes in successive passes through the loop; the second-user pose information and the updated second-user pose information include second skeletal tracking data; and the first computing device is caused to render the second-user avatar-data object based on the second skeletal tracking data of the second user to thereby display the second-user avatar of the second user posed with a body which changes appearance as the second skeletal tracking data changes in successive passes through the loop.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

To the extent that terms "includes," "including," "has," "contains," and variants thereof are used herein, such terms are intended to be inclusive in a manner similar to the term "comprises" as an open transition word without precluding any additional or other elements.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system, comprising:
a processor and memory of a computing device of a first user, the processor being configured to execute an augmented reality (AR) avatar program using portions of memory to:
receive a second-user avatar-data object and second-user pose information of a second user, via a computer network;
receive an image from a live image feed captured by a camera of the computing device;
identify a virtual surface corresponding to a physical surface that appears in the image;
calculate a position and a pose of a second-user avatar relative to the virtual surface based on the second-user pose information;
render the second-user avatar-data object to thereby display the second-user avatar of the second user superimposed upon the image, the second-user avatar being anchored to the virtual surface and posed according to the calculated position and pose of the second-user avatar, the virtual surface being world-locked to the physical surface in the image in a real world three-dimensional environment.

2. The computing system of claim 1, wherein
the second-user pose information is initial second-user pose information of a session of the AR avatar program; and
the image is an initial image of the session of the AR avatar program.

3. The computing system of claim 1, wherein the AR avatar program is executed to, in a loop:
receive updated second-user pose information of the second user via the computer network;
receive an updated image from the live image feed captured by the camera of the computing device;
calculate a position and a pose of the second-user avatar relative to the virtual surface based on the updated second-user pose information; and
render the second-user avatar-data object to thereby display the second-user avatar superimposed upon the updated image and posed according to the updated pose information on each pass through the loop while the second-user avatar remains anchored to the virtual surface, which remains world locked to the physical surface in the image in the real world three-dimensional environment.

4. The computing system of claim 3, wherein the second-user pose information and the updated second-user pose information include second face tracking data;
the processor is configured to render the second-user avatar-data object of the second user based on the second face tracking data to thereby display the second-user avatar of the second user posed with a face which corresponds to a facial expression of the second user; and
the face of the second user avatar is rendered so as to change appearance as the second face tracking data changes in successive passes through the loop.

5. The computing system of claim 1, wherein
the second-user pose information includes second face tracking data; and
the processor is configured to render the second-user avatar-data object of the second user based on the second face tracking data to thereby display the second-user avatar of the second user posed with a face which corresponds to a facial expression of the second user.

6. The computing system of claim 1, wherein
the second-user pose information includes second skeletal tracking data; and
the processor is configured to render a body of the second-user avatar so as to change appearance as the second skeletal tracking data changes.

7. The computing system of claim 1, wherein the camera is a rear-facing camera and the computing device is a first computing device, the computing system further comprising:
a front-facing camera configured to capture a first-user image of the first user,
wherein the processor is configured to:
identify tracking features in the first-user image of the first user, and
generate first-user pose information of the first user based on the identified tracking features; and send the first-user pose information to a second computing device of the second user via the computer network.

8. The computing system of claim 7, wherein
the first-user pose information includes first face tracking data; and
the processor is configured to render a first-user avatar-data object of the first user based on the first face tracking data to thereby display the first-user avatar of the first user posed with a face which corresponds to a facial expression of the first user.

9. The computing system of claim 7, wherein the processor is further configured to render a first-user avatar-data object of the first user to thereby display the first-user avatar of the first user superimposed upon the image, the first-user avatar posed according to the first-user pose information.

10. The computing system of claim 9, wherein the front-facing camera and the rear-facing camera are operated to capture the first-user image and the image, respectively, in real-time with time stamps syncing the identified tracking features in the image with the identified tracking features in the first-user image of the first user.

11. The computing system of claim 7, wherein
the processor is configured to:
    identify tracking features in the image captured by the rear-facing camera and the first-user image of the first user;
    generate first-user pose information of the first user based on the identified tracking features; and
    send the first-user pose information to the second computing device of the second user via the computer network.

12. The computing system of claim 1, wherein
the computing device is a first computing device;
the first user and the second user each have associated accounts on a social media platform;
the first computing device and a second computing device each execute an instance of the AR avatar program that is configured to communicate with a server computing system of the social media platform; and
a first-user pose information of the first user, a first-user avatar-data object of the first user, the second-user pose information, and the second-user avatar-data object are exchanged between the AR avatar program executed on the first computing device and the AR avatar program executed on the second computing device via the server computing system.

13. A method for a client program executed on a computing device operated by a first user, the method comprising steps to:
receive a second-user avatar-data object and second-user pose information of a second user, via a computer network;
receive an image from a live image feed captured by a camera of the computing device;
identify a virtual surface corresponding to a physical surface that appears in the image;
calculate a position and a pose of a second-user avatar relative to the virtual surface based on the second-user pose information; and
render the second-user avatar-data object to thereby display the second-user avatar of the second user superimposed upon the image, the second-user avatar being anchored to the virtual surface according to the calculated position and pose of the second-user avatar, the virtual surface being world-locked to the physical surface in the image in a real world three-dimensional environment.

14. The method of claim 13, further comprising steps to, in a loop:
receive updated second-user pose information of the second user via the computer network;
receive an updated image from the live image feed captured by the camera of the computing device;
calculate a position and a pose of the second-user avatar relative to the virtual surface based on the updated second-user pose information; and
render the second-user avatar-data object to thereby display the second-user avatar of the second user superimposed upon the updated image, the second-user avatar posed according to the updated second-user pose information on each pass through the loop while the second-user avatar remains anchored to the virtual surface, which remains world-locked to the physical surface in the image in the real world three-dimensional environment.

15. The method of claim 13, wherein
the second-user pose information includes second face tracking data; and
the method further comprises rendering the second-user avatar-data object of the second user based on the second face tracking data to thereby display the second-user avatar of the second user posed with a face which corresponds to a facial expression of the second user.

16. The method of claim 13, wherein
the computing device is a first computing device; and
the method further comprises steps to:
    capture a first-user image of the first user;
    identify tracking features in the first-user image of the first user;
    generate first-user pose information of the first user based on the identified tracking features; and
    send the first-user pose information to a second computing device of the second user via the computer network.

17. The method of claim 16, wherein
the first-user pose information includes first face tracking data; and
the method further comprises rendering a first-user avatar-data object of the first user based on the first face tracking data to thereby display the first-user avatar of the first user posed with a face which corresponds to a facial expression of the first user.

18. A server computing device, comprising:
a processor;
a non-volatile storage device operatively coupled to the processor; and
an avatar hosting program stored in the non-volatile storage device and executed by the processor of the server computing device, wherein
the avatar hosting program is configured to host an avatar session to:
    receive and store a second-user avatar-data object and second-user pose information of a second user from a second computing device;
    responsive to receiving a first request from a first computing device for a second-user avatar, send the second-user avatar-data object and the second-user pose information to the first computing device, thereby causing the first computing device to render the second-user avatar-data object and display the second-user avatar;

receive and store a first-user avatar-data object and initial first-user pose information of a first user from the first computing device;

responsive to receiving a second request from the second computing device for a first-user avatar, send the first-user avatar-data object and the initial first-user pose information to the second computing device, thereby causing the second computing device to render the first-user avatar-data object and display the first-user avatar; and in a loop:

receive updated second-user pose information of the second user from the second computing device; and responsive to receiving the updated second-user pose information, send the updated second-user pose information to the first computing device, thereby causing the first computing device to render the second-user avatar-data object using the updated second-user pose information and display the second-user avatar;

receive updated first-user pose information of the first user from the first computing device; and responsive to receiving the updated first-user pose information, send the updated first-user pose information to the second computing device, thereby causing the second computing device to render the first-user avatar-data object using the updated first-user pose information and display the first-user avatar.

19. The server computing device of claim 18, wherein the initial first-user pose information and the updated first-user pose information include first face tracking data;

the second computing device is caused to render the first-user avatar-data object of the first user based on the first face tracking data to thereby display the first-user avatar of the first user posed with a face which corresponds to a facial expression of the first user;

the second-user pose information and the updated second-user pose information include second face tracking data; and the first computing device is caused to render the second-user avatar-data object of the second user based on the second face tracking data to thereby display the second-user avatar of the second user posed with a face which corresponds to a facial expression of the second user.

20. The server computing device of claim 18, wherein the initial first-user pose information and the updated first-user pose information include first skeletal tracking data;

the second computing device is caused to render the first-user avatar-data object of the first user based on the first skeletal tracking data to thereby display the first-user avatar of the first user posed with a body which changes appearance as the first skeletal tracking data changes in successive passes through the loop;

the second-user pose information and the updated second-user pose information include second skeletal tracking data; and the first computing device is caused to render the second-user avatar-data object based on the second skeletal tracking data of the second user to thereby display the second-user avatar of the second user posed with a body which changes appearance as the second skeletal tracking data changes in successive passes through the loop.

* * * * *